US009754452B2

(12) United States Patent
St. John et al.

(10) Patent No.: US 9,754,452 B2
(45) Date of Patent: Sep. 5, 2017

(54) BONUS EVENT IN SLOT MACHINE PLAY

(71) Applicants: Sarah Anne St. John, Las Vegas, NV (US); Daniel L. Sahl, Las Vegas, NV (US)

(72) Inventors: Sarah Anne St. John, Las Vegas, NV (US); Daniel L. Sahl, Las Vegas, NV (US)

( * ) Notice: Subject to any disclaimer, the term of this patent is extended or adjusted under 35 U.S.C. 154(b) by 0 days.

(21) Appl. No.: 14/967,292

(22) Filed: Dec. 12, 2015

(65) Prior Publication Data

US 2017/0169665 A1 Jun. 15, 2017

(51) Int. Cl.
*A63F 13/00* (2014.01)
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
None
See application file for complete search history.

(56) References Cited

U.S. PATENT DOCUMENTS

2004/0092300 A1* 5/2004 Gauselmann ........... G07F 17/32 463/16
2004/0171420 A1* 9/2004 Baerlocher ............. G07F 17/32 463/20
2007/0287529 A1* 12/2007 Kojima ................... G07F 17/32 463/20
2014/0094248 A1* 4/2014 Vancura ................ G07F 17/326 463/20
2015/0148117 A1* 5/2015 Falciglia, Sr. ...... G07F 17/3288 463/20

* cited by examiner

*Primary Examiner* — Jason Yen
(74) *Attorney, Agent, or Firm* — Mark A. Litman & Associates, P.A.

(57) ABSTRACT

A method and apparatus provides a bonus event on an electronic video gaming machine having touchscreen sensitivity on a video display in communication with a processor. The method includes:

a) triggering a bonus event;
b) providing and displaying at least one wild card symbol in a fixed position in columns and rows used to determine a bonus outcome;
c) the processor generates a first random symbol for use in the bonus game which is displayed on the video gaming machine;
d) the touch screen is activated so that a final position for the first random symbol is selectable by touchscreen activity;
e) the processor filling the unfilled frames with random symbols; and
f) the processor resolving a bonus outcome of the bonus outcome according to paylines within the columns and rows used to determine the bonus outcome.

20 Claims, 18 Drawing Sheets

BONUS EVENT IN SLOT MACHINE PLAY

BACKGROUND OF THE INVENTION

1. Field of the Invention

The present invention relates to the field of gaming technology and especially to the field of electronic gaming machines and more particularly with regard to electronic video gaming machines with bonus event awards.

2. Background of the Art

Gaming machines, and in particular slot machine games, have grown exponentially in numbers in the last twenty years, as have the revenues generated by such devices. Since it is estimated that at least 70% of any casino's revenue are now provided by gaming machines, there is increasingly fierce competition among the machine manufacturers to attract and maintain customers with game content.

Slot manufacturers strive to differentiate their machines by adding unique features and methods, and these proprietary innovations are designed to initially attract a player to a particular slot machine and then retain the player's interest for protracted periods of time.

Especially in the last decade, primary or base machine games have been augmented by special features that are particularly popular with the gaming public. Two of the most popular features are known in the art as bonus game play and progressive game play. Bonus game play may consist of certain enhancements to the base game play, such as free spins and multipliers, or it may add a separate bonus game event that either replaces the base game on the screen or is displayed in a second screen. In many cases the awards that may be won in a bonus game are more lucrative than base game pays, so the player is encouraged to play for longer periods until the bonus opportunity is achieved. Progressive game play usually involves linking slot machines in a network, with a portion of each player's wager being utilized to fund a jackpot award. The jackpot award most commonly starts at a minimum (or "seed") amount, and increases as each wager is made. When a player hits a "triggering event" (e.g., a particular symbol combination along a particular wagered payline, or a particular number of scatter pay symbols, for instance), the player wins the progressive jackpot, which can be a life-changing amount. Even though the base game payouts are usually decremented or reduced in comparison to games without jackpot events to allow for the incrementing contributions to the jackpot, progressive game play remains enormously popular due to jackpots that can reach well into the millions of dollars.

Certain prior art has attempted to enhance the known slot machine game play.

U.S. Pat. No. 7,223,172 (Baerlocher, et al.) provides a gaming device having a bonus scheme, wherein the player may choose when to play a bonus scheme, so long as the player is qualified to do so. The method of qualifying the player to enter the bonus round connects or links the base game operation of the gaming device with the bonus scheme. The reels of the base game contain symbols which alone or in combination with other symbols yield one or more bonus awards to a player. The bonus awards are escrowed and displayed a bonus award escrow display. Once the player obtains a single bonus award, the player becomes eligible or qualified to play the bonus round and the player may choose to do so at any time. The player can accumulate bonus awards and use multiple bonus awards at one time.

U.S. Pat. No. 6,887,154 (Luciano, et al.) discloses a progressive system (local and wide area) where a primary and secondary progressive meter is maintained. When a progressive win event occurs, there are two payouts: the first payout (defined by the primary meter) is paid to the player triggering the progressive payout event; the second payout (defined by the secondary meter) is paid to other players (or game devices) having "active" or "enrolled" status at the time of the primary payout event. The method automates the "shared" win, including means for readily determining "active" players. The progressive prizes may be funded using traditional methods (e.g., percentage of wagers, marketing budget). The progressive prizes may also be funded using expired prizes which have expired or lapsed.

U.S. Pat. No. 6,234,895 (Jones, et al.) discusses a method for including a progressive jackpot component in a live casino table game. In addition to playing a live casino table game, each player makes an additional wager at the beginning of each hand that makes that player eligible to win all or part of a jackpot. If during the play of the hand a player is dealt a predetermined arrangement of cards, the player wins a preselected percentage of the jackpot amount. The jackpot is progressive in that undistributed amounts of the jackpot carry over to the next hand. Apparatus is provided to receive each gaming token wagered for the jackpot component, to increment the jackpot meter which displays the jackpot amount, to decrement the jackpot meter whenever a winning hand is paid and to reset the apparatus for the next hand.

United States Patent Application No. 20070077990 (Cuddy, et al.) discloses a gaming system including a central server linked to a plurality of gaming machines. Upon a suitable triggering event at a triggering gaming device in the gaming system a bonus event occurs. When the bonus event occurs, the players actively playing each auxiliary gaming device in the gaming system are each provided a chance to participate in the bonus event as well. Each remaining gaming device's chance of participating in the bonus event is based on the individual accumulated bonus event pool for that gaming device.

United States Patent Application No. 20070072673 (Bennett, et al.) discloses a gaming machine that has a display and a game controller arranged to control images displayed on the display. The game controller is arranged to play a game wherein one or more random events arc caused to be displayed on the display and, if a predefined winning event results, the machine awards a prize which is credited to a credit meter of the machine. The credit meter includes two meter displays, a first meter display indicating credit which is available for expenditure in the machine to play at least one game and a second meter display indicating credit set aside by at least one of a player and the game controller and which credit is unavailable to the player for wagering on a game but which is only available by termination of a playing session.

United States Patent Application No. 20070026924 (Taylor) teaches a gaming device wherein various events pay players in multiple classes of credits. One class of special credits has no cash value and may only be rewagered in an attempt to win traditional cash-equivalent credits. The player decides when to play a bonus game where the special credits are bet.

United States Patent Application No. 20070004505 (Walker, et al.) describes a method for providing entry into a bonus game at a gaming device, where the bonus games may occur at predictable times and may payout predictable amounts. In one or more embodiments, a gaming device may provide a guaranteed entry into a bonus game every hour on the hour, so long as a player meets one or more criteria. Criteria may include a total amount wagered, a total number of handle pulls completed, or a total amount of time spent at a gaming device. One or more embodiments provide a method for withholding value from a player in order that the value may be delivered later in the form of a guaranteed entry into a bonus game. One or more embodiments provide a method whereby multiple gaming devices may provide entry in bonus rounds simultaneously, thereby creating mutually reinforcing sounds and visual displays.

United States Patent Application No. 20050014553 (Byrne) discloses a collateral gambling game which can be won by players on, at least, one specific event occurring in the principal game; the collateral game being separate from the principal game, but won when any of the possible winning events occur in the principal game, with the payment to the player being calculated from the total value available for the game divided by the total number of players who bet on the specific winning event. The game gives a possibility for a large number of players to share in the success of a single player who has successfully won the main game. It may be used with various types of games, including those using electronic gaming machines.

SUMMARY OF THE INVENTION

A method and apparatus provides a bonus event on an electronic video gaming machine having touchscreen sensitivity on a video display in communication with a processor. The method includes:

a) triggering a bonus event;
b) providing and displaying at least one wild card symbol in a fixed position in at least one column and especially within a non-end column (far left of far right) and more preferably within the middle column. These columns are used to determine a bonus outcome such that it divides the slot screen into a left and right section;
c) the processor generates a number of at least a first random symbol for use in the bonus game which is displayed on the video gaming machine. Ultimately random symbols will be provided in numbers equal to the number of empty slot spaces on the screen;
d) the processor progressively generates x-number of random symbols equal to the number of empty spaces on the screen
e) each randomly-generated symbol is revealed to the player one at a time
f) the touch screen is activated so that the player may select whether the symbol should be placed on the left side or the right side of the center column of wild symbols (individually providing that a final position for the first random symbol (and subsequent random symbols) is selectable by touchscreen activity;
g) after the player has indicated on the touchscreen which side of the wild column the symbol should be placed, the processor will either randomly select an open row and column to place the symbol or allow the player to select a specific final position for the random symbol to be placed;
h) at the completion of the player's actions filling all frames within the bonus event display of columns and rows, the processor resolving a bonus outcome of the bonus outcome according to paylines within the columns and rows used to determine the bonus outcome.

Another description of a method and apparatus provides a bonus event on an electronic video gaming machine having touchscreen sensitivity on a video display in communication with a processor. The method includes:

a) triggering a bonus event;
b) providing and displaying at least one wild card symbol in a fixed position in at least one column and especially within a non-end column (far left of far right) and more preferably within the middle column. These columns are used to determine a bonus outcome. The center column divides the slot screen into a left and right section;
c) the processor generates of at least a first random symbols for use in the bonus game which is displayed on the video gaming machine. Ultimately random symbols will be provided in numbers equal to the number of empty slot spaces on the screen;
d) the processor progressively generates x-number of random symbols equal to the number of empty spaces on the screen
e) each randomly-generated symbol is revealed to the player one at a time
f) the touch screen is activated so that the player may select whether the symbol should be placed on the left side or the right side of the center column of wild symbols (individually providing that a final position for the first random symbol (and subsequent random symbols) is selectable by touchscreen activity. The sides may or may not be restricted as to available choices;
g) after the player has indicated on the touchscreen which side of the wild column the symbol should be placed, the processor will either randomly select an open row and column to place the symbol or allow the player to select a specific final position for the random symbol to be placed;
h) the processor filling the unfilled frames with random symbols, either randomly or upon player direction; and
i) at the completion of the player's actions and/or processor's action filling all frames within the bonus event display of columns and rows, the processor resolving a bonus outcome of the bonus outcome according to paylines within the columns and rows used to determine the bonus outcome.

DETAILED DESCRIPTION OF THE INVENTION

Figure 1:
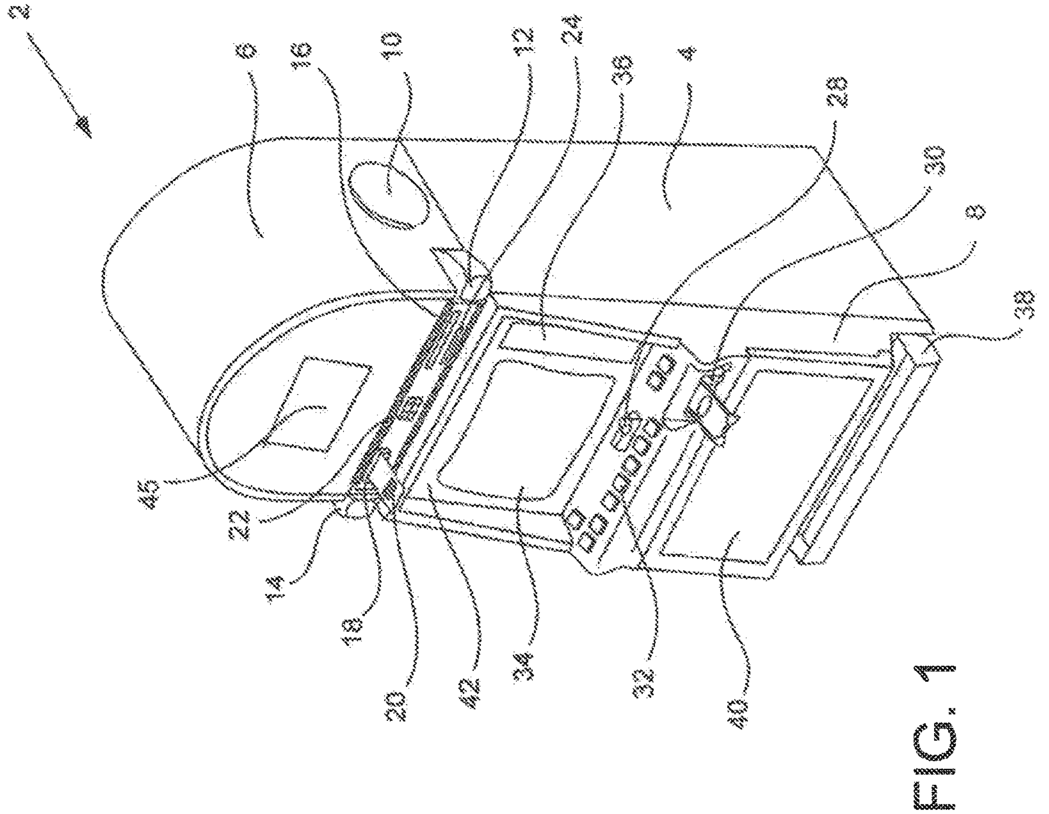
FIG. 1 shows an electronic gaming table on which the gaming method may be executed.

The present technology includes a method and a system for enabling a bonus event in an electronic video gaming machine. The apparatus in the system would include:

a) a housing for the electronic video gaming machine. This would be in the form of a stand-alone gaming machine; a bank of independently operating games on the individual machines; a bank or network of interrelated machines, either with cooperating game play or cooperating jackpots (e.g., a collective progressive jackpot, envy wagers, etc.); or with distal engagement through wireless or wifi communication to individual or collective gaming machines.
b) a processor within the housing. This processor may be single processor, interacting groups of microprocessors, mixtures of processor(s) and chip boards and fixed operation intelligence or hardware (such as ASICs and FPGAs).
c) at least one video display on a front of the housing. The video display must be visible to players at the front of the electronic gaming device, and may be any display device as known in the gaming art for use in wagering systems.
d) player input controls on the front of the housing. The player input controls may be buttons, switches, joy sticks, electronic mouse, touchscreens, dials and the like.
e) It is highly desirable to have touchscreen sensitivity on the video display in communication with the processor. This will assist in unique gaming steps practiced within the scope of the present technology and invention.

The processor is configured to accept a wager on an underlying video wagering game and randomly trigger a bonus event on the underlying wagering game. The processor should be configured (e.g., with software or hardware) such that after the bonus game has been initiated, the processor provides and displays at least one wild card symbol in a fixed position within a column of symbols used in a set of frames in columns and rows used to determine a bonus outcome. The processor is configured such that after displaying the at least one wild symbol in the fixed position, the processor generates a first random symbol for use in the bonus game which is displayed on the video gaming machine. One preferred method of play is using a 3×3, 3×5 or 5×5 video screen. All of these configurations offer a horizontal symmetry of uneven numbers of columns. By placing or requiring all wild card bonus symbols to be located on the central column (e.g., the third column in the 3×5 and 5×5 configurations), the next added random symbols can be positioned evenly between a nominal right side (all frames to the right of the central column) and nominal left side (all frames to the left of the central column).

The processor may be configured such that after generation of the first random figure, the touch screen is activated so that a final position for the first random symbol is selectable by touchscreen identification of the final position in the columns and rows used to determine a bonus outcome, leaving unfilled frames in the columns and rows. The player grips (by contact pressure on the touch screen) the symbol, slides it to the desired final position and contact released to leave the symbol in a desired position. It is desirable for control of probabilities that if a first random symbol is moved to a right side, all even number revealed symbols must then be placed on the nominal left side, and all remaining odd number (the third, the fifth, the seventh, etc.) symbols must be placed on the nominal right side. Other requirements can be placed on placement, such as requiring any first random symbol to be placed in a first (or last) nominal right column or a last (or first) nominal right column an possibly sequential random symbols to be placed in sequentially lower rows, or sequentially higher columns, or first rows must be filled on a nominal side before any other row may be filled, and the like. Winning paylines are preferably limited to linear horizontal lines beginning from left-to-right, or even right-to-left. Diagonal lines or non-linear (e.g., zig-zag) lines may be used as paylines, and even scatter pay symbols may be present, with wild cards being active or inactive with regard to scatter pay symbols.

The processor is configured to fill the unfilled frames in the columns and rows with random symbols. As noted above, the processor may be minimally engaged in the selection of specific frames within which symbols are to be placed, with players using the touchscreen functions to locate the randomly selected symbols. The processor does randomly select symbols (e.g., using a random number generator or other random selection system), and there may be a function button to have the processor randomly position the symbols. The player may enter the accelerated placement, or if the positioning becomes too slow, the processor may begin automatically placing symbols, the time period may be slight (e.g., 5-10 seconds for placement) and the time period may change as optionally available decrease (e.g., with 12 available spaces (6 each on the nominally left and nominally right) the first one or two may be required by the processor to be placed within 15 seconds, the next one or two within 12 seconds, the next one or two symbols must be placed within 10 seconds, etc. This is referred to herein as processor required accelerated placement.

The processor is configured to resolve an outcome of the bonus outcome according to paylines within the columns and rows used to determine a bonus outcome.

In the system, the processor may be configured to enable touchscreen sensitivity (for the first time) after appearance of the first random symbols allowing for selection of a final position of the first random symbol by first touching the touchscreen at a touch-sensitive position over the random symbol and then by sliding the random symbol to the final position. The processor may be configured to generate and display the first random symbol at a position on the touchscreen outside of the columns and rows used to determine a bonus outcome. The processor may be configured to generate and display the first random symbol at a position on the touchscreen within the columns and rows used to determine a bonus outcome. There may even be a separate smaller screen or elevated screen that accomplishes this in addition to the player touchscreen moveable random symbols placed on the screen. For example, the system may have a light display associated with the housing that indicates when a bonus event is occurring and what symbols are being provided for placement. The light display should be near a top level of the housing so that passersby of the system are alerted that a bonus event is occurring. The processor is configured to provide at least some subsequent random symbols to fill the unfilled frames by displaying at least some additional individual random symbols and the processor is configured such that after provision of the at least some subsequent random symbols, the touch screen is activated so that a final position for the at least some subsequent random symbols are selectable by touchscreen identification of the final position in the columns and rows used to determine a bonus outcome, leaving unfilled frames in the columns and rows. The processor may be configured to allow all unfilled frames after the final position of the first random symbol has been determined by touchscreen positioning of all remaining symbols into frames or configured to allow all unfilled frames after the final position of the first random symbol has been determined by touchscreen positioning of at least some remaining symbols into frames.

As briefly discussed above, the processor may be configured to allow final positioning alternative random systems into positions in columns and rows on opposite sides of the final position for wild symbols, which the processor is configured to position in only a central column position.

There is also a method for playing an electronic video gaming machine which provides a bonus event, the electronic video gaming machine comprising a housing for the electronic video gaming machine; a processor within the housing; at least one video display on a front of the housing; player input controls on the front of the housing; and touchscreen sensitivity on the video display in communication with the processor. The method having steps of:

a) the processor accepting a wager on an underlying video wagering game and at conclusion of a round of play in the underlying game, triggering a bonus event;
b) after the bonus game has been initiated, the processor provides and displays at least one wild card symbol in a fixed position within a column of symbols used in a set of frames in columns and rows used to determine a bonus outcome;
c) after displaying the at least one wild symbol in the fixed position, the processor generates a first random symbol for use in the bonus game which is displayed on the video gaming machine;
d) after generation of the first random figure, the touch screen is activated so that a final position for the first random symbol is selectable by touchscreen identification of the final position in the columns and rows used to determine a bonus outcome, leaving unfilled frames in the columns and rows;
e) the processor filling the unfilled frames in the columns and rows with random symbols; and
f) the processor resolving a bonus outcome of the bonus outcome according to paylines within the columns and rows used to determine the bonus outcome.

A preferred method play and system is a 3×5 slot system. In the underlying game, there may be as many lines as is typically available in advanced 3×5 (columns×rows) video slot machines, with many paylines available. Players may wager in the underlying game 1×-10× (or more) on each payline. Typically, all pays are read from left to right along the allowed paylines. Any wild symbols in the underlying game can be used for all other symbols, except for bonus triggers.

Any underlying game pay schedule may be used, such as increased payout odds for increasing numbers of winning symbols on a payline. Any bonus triggering event may be used, but a typical bonus triggering event would be the occurrence of three consecutive trigger bonus symbols in a horizontal line (any of them or only on a third line wagered to maximize wagers), four triggering symbols in a diagonal line or five triggering symbols in a non-linear payline.

A typical payline schedule might be as follows:

Symbol Set and Pay Table
(All pays times bet level)

| Symbol | Description | Type | Pay 5 | Pay 4 | Pay 3 | Pay 2 |
|---|---|---|---|---|---|---|
| W_01 | Wild | L to R | 1,000 | 250 | 50 | 10 |
| S_02 | | L to R | 500 | 100 | 20 | 5 |
| S_03 | | L to R | 500 | 100 | 20 | 5 |
| S_04 | | L to R | 500 | 100 | 20 | 5 |
| S_05 | | L to R | 500 | 100 | 20 | 5 |
| S_06 | | L to R | 500 | 100 | 20 | 5 |
| S_07 | | L to R | 150 | 45 | 15 | 2 |

-continued

Symbol Set and Pay Table
(All pays times bet level)

| Symbol | Description | Type | Pay 5 | Pay 4 | Pay 3 | Pay 2 |
|---|---|---|---|---|---|---|
| S_08 | | L to R | 120 | 30 | 10 | 0 |
| S_09 | | L to R | 120 | 30 | 10 | 0 |
| S_10 | | L to R | 100 | 25 | 8 | 0 |
| S_11 | | L to R | 100 | 25 | 8 | 0 |
| S_12 | | L to R | 100 | 25 | 8 | 0 |
| SC_2 | On R 2, 3, 4 | Trigger | XXX | XXX | Free Spins | 0 |

Free Spin Bonus

| Trigger | Entry Pay | Spins | Re-Trigger Spins |
|---|---|---|---|
| Any 3 SC_2 | 0 | 3 | 0 |

Free spin reels are the DIFFERENT from base game reels.
All positions on Reel 3 are Wild.
All positions on Reels 1, 2, 4 and 5 are Blank at the start.
1 symbol will be presented to the player, and the player will be prompted to chose left or right. If left is chosen then that symbol will be assigned randomly to Reel 1 or 2. Otherwise that symbol will be assigned randomly to Reel 4 or 5.
After the 1st choice is another symbol will be presented to the player who must make the same choice. This repeats until all spaces are filled.
At this point the 1st free spin is resolved.
2 additional free spins will then be awarded.
It is not possible to win more free spins.

Computer-Based Implementations

Methods of the present invention may be implemented in computer hardware, software, or computer hardware and software. A most common form of computer implementation is a stand-alone, single player electronic gaming machine with electronic player controls and one or more video output screens.

In computer-based embodiments, the gaming device preferably includes at least one processor, such as a microprocessor, a microcontroller-based platform, a suitable integrated circuit or one or more application-specific integrated circuits (ASIC's) or Field Programmable Gated Arrays (FPGA's). The processor is in communication with or operable to access or to exchange signals with at least one data storage or memory device, and/or a player monitor or monitors. In one embodiment, the processor and the memory device reside within the cabinet of a gaming device. Multiple gaming devices are typically connected to a casino information network.

The memory device stores program code and instructions, executable by the processor, to control the gaming device. The memory device also stores other data such as image data, event data, player input data, random or pseudo-random number generators, pay-table data or information, House Ways distributions and applicable game rules that relate to the play of the gaming device. In one embodiment, the memory device includes random access memory (RAM): which can include non-volatile RAM (NVRAM): magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device.

In other embodiments, part or all of the program code and/or operating data described above can be downloaded to the memory device through a suitable network. In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. The gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "processor" or "computer" or "controller" or "game controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome. It is also possible for templates or weighted templates of sets of tiles or paylines as disclosed in U.S. Pat. Nos. 6,159,096 and 6,117,009 (Yoseloff, which are incorporated by reference in their entirety) which disclose a method of configuring a video output gaming device to randomly generate game outcomes. The method includes the steps of selecting a set of game symbols, assigning a probability of occurrence to each symbol, selecting a plurality of outcome templates, each template comprising X variables, selecting a probability of occurrence for each outcome template, assigning a subset of symbols from the set of game symbols to each template for filling the positions, defining payouts for selected outcomes, and configuring a video output gaming device, which randomly selects a template, randomly selects a symbol for each variable in the template from the subset of game symbols assigned to the selected template, randomly fills at least a portion of the positions in the template and displays the outcome on a video output display. A video output gaming device programmed to randomly select a template, randomly select symbols to define the variables and randomly display the selected symbols is also disclosed.

In one embodiment, described in more detail below as a "chipless gaming platform", the gaming device includes one or more display devices that are mounted into a gaming table surface and are controlled by the processor in addition to or separately from the individual player monitors. The display devices are preferably connected to or mounted into the table structure. This may include a central display device which displays a primary game, dealer images, jackpot information, or information that is not specifically related to the game, such as sports information or winning events at other tables. This display device may also display any suitable secondary game associated with the primary game as well as information relating to the primary or secondary game (e.g., side bets, bonuses, jackpots and the like).

An alternative embodiment may include a central horizontal game display device and a vertically oriented virtual dealer display device as in Shuffle Master, Inc.'s Table Master™ gaming system. The central display device may display the primary game, any suitable secondary game associated or not associated with the primary game and/or information relating to the primary or secondary game. These display devices may also serve as digital glass operable to advertise games or other aspects of the gaming establishment. The gaming device includes a credit display 20 which displays a player's current number of credits, cash, account balance, or the equivalent. In one embodiment, the gaming device includes a bet display displays a player's amount wagered. In one embodiment, as described in more detail below, the gaming device includes a player tracking display which displays information regarding a player's play tracking status.

In yet another embodiment, at least one display device may be a mobile display device, such as a PDA or tablet PC that enables play of at least a portion of the primary or secondary game at a location remote from the gaming device. The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism.

In one embodiment, as described in more detail below, the display device includes a touch-screen with an associated touch-screen controller. The display devices may be of any suitable size and configuration, such as a square, a rectangle or an elongated rectangle. The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, images of dealers and the like.

Other forms of the invention are in the form of game software that is implemented in a variety of formats, such as internet gaming, PC practice play, hand-held game devices, wireless gaming devices and the like.

Chipless Gaming Table Implementation

One enabling system useful in the practice of the present invention is the use of playing cards with Chinese domino symbols which can be distributed for use with a system marketed under the name i-TABLE™ by Shuffle Master, Inc. of Las Vegas, Nev. That system includes: a) a physical gaming table; b) player monitors at each player position; c) a playing card reading and delivery system (e.g., commercially available shufflers and playing card delivery shoes with reading capability as sold under the Trade names of One2Six™ shuffler, Ace™ shuffler, I-DEAL™ shuffler, I-SHOE™ delivery shoe, etc.); d) a processor receiving information (numbers of cards, rank of cards, suits of cards, etc.) from the card reading and delivery systems; e) communication connectivity (hardwired or wireless) between necessary combinations of the card reading/delivery systems and the processor, the processor and the individual player monitors, and/or the card reading/delivery systems and the video monitors; and f) software in the processor that defines predetermined advantage for distributions of playing cards into multiple hands, game rules, hand history, and the like.

With regard to software f), it is understood in the practice of the present technology that this is not complex software that reads individual player hand cards and determines advantageous card distributions for a first time by extensive calculations. Rather, the entire range of possibilities of hands (e.g., all possible five card sets dealt to players in poker-style games) are known in poker style games.

A preferable card handling device for administering a video reel-type-style game is a hand-forming shuffler with integrated card recognition technology, from which playing cards are supplied, with a least a rank/count (and preferable also suit) of individual packs of cards are known before the cards are removed and delivered to player positions and/or the dealer position. The card delivery system 102 is in communication with the controller 128 by wired or wireless communication methods. Communication between the various system components is not limited to electronic or electrical signals, but may include optical signals, audio signals, magnetic transmission or the like.

The individual player position processors (not shown) are preferable graphics processors and not full content CPUs as a cost saving, space saving, and efficiency benefit. With the reduced capacity in the processor as compared to a CPU, there is actually reduced likelihood of tampering and fraudulent input.

Turning next to FIG. 1, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a display area including a mechanical gaming system (or less preferably a separate electronic game) 40. There may be an overlay of touchscreen functionality on the separate electronic game 40 or some of the buttons 32 may be functional on the separate mechanical gaming system 40. That: separate mechanical gaming system may be in a relatively vertical viewing position as shown or in a more horizontal (table like) display unit. Viewable through the main door is a video display monitor 34 and an information panel 36. The display monitor 34 will typically be a cathode ray tube, high resolution flat-panel LCD, LED, plasma screen or other conventional electronically controlled video monitor. The information panel 36 may be a hack-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaining machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaining machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIG. 1. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry' (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaining environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaining machines relative to general-purpose computing machines and some examples of the additional (or different) components and features found in gaming machines are described below.

At first glance, one might think that adapting PC technologies to the gaining industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaining industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

Gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modem general-purpose computers include voltage monitoring circuitry, these types of circuits only report voltage status to the operating software. Out of tolerance voltages can cause software malfunction, creating a potential uncontrolled condition in the gaming computer. Gaming machines typically have power supplies with tighter voltage margins than that required by the operating circuitry. In addition, the voltage monitoring circuitry implemented in gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc. that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaining machine prior, during and/or after the disputed game to demonstrate whether the player was correct or not in their assertion.

Another feature of gaming machines, such as gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include ETA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, the Netplex™ system of IGT is a proprietary communication protocol used for serial communication between gaming devices. As another example, SAS is a communication protocol used to transmit information, such as metering information, from a gaming machine to a remote device. Often SAS is used in conjunction with a player tracking system.

Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into a gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in a gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights within the separate mechanical (or electronic) separately, individually wagerable gaming system 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 1A:
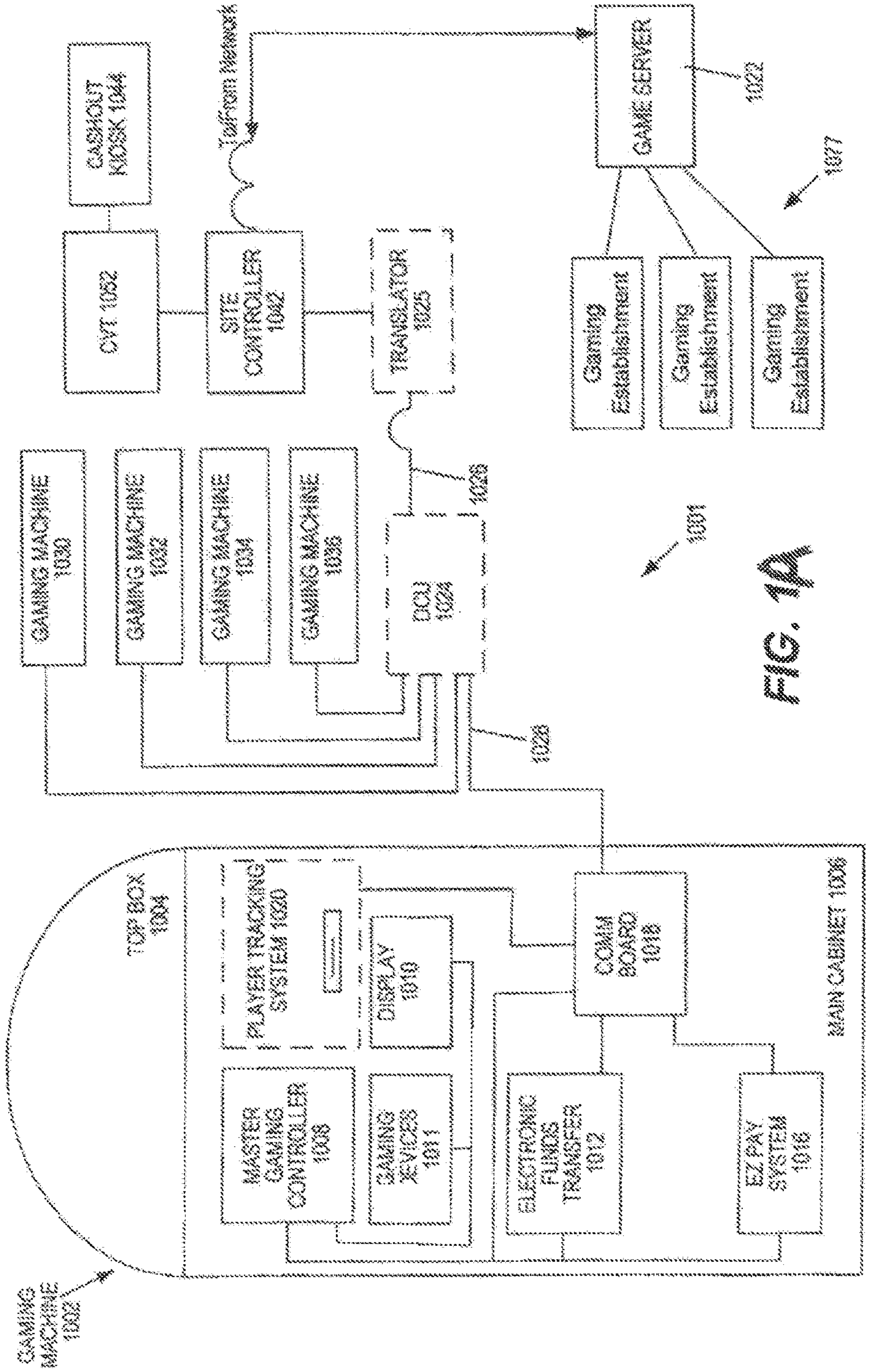
FIG. 1A shows a schematic for an electronic system for enabling play of the gaming method described herein.

Another gaming network that may be used to implement some aspects of the invention is depicted in FIG. 1A. Gaming establishment 1001 could be any sort of gaming establishment, such as a casino, a card room, an airport, a store, etc. In this example, gaming network 1077 includes more than one gaming establishment, all of which are networked to game server 1022.

Here, gaming machine 1002, and the other gaming machines 1030, 1032, 1034, and 1036, include a main cabinet 1006 and a top box 1004. The main cabinet 1006 houses the main gaming elements and can also house peripheral systems, such as those that utilize dedicated gaming networks. The top box 1004 may also be used to house these peripheral systems.

The master gaming controller 1008 controls the game play on the gaming machine 1002 according to instructions and/or game data from game server 1022 or stored within gaming machine 1002 and receives or sends data to various input/output devices 1011 on the gaming machine 1002. In one embodiment, master gaming controller 1008 includes processor(s) and other apparatus of the gaming machines described above. The master gaming controller 1008 may also communicate with a display 1010.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1008 may also communicate with EFT system 1012, EZPay™ system, and player tracking system 1020. The systems of the gaming machine 1002 communicate the data onto the network 1022 via a communication board 1018.

It will be appreciated by those of skill in the art that embodiments of the present invention could be implemented on a network with more or fewer elements than are depicted in FIG. 1A. For example, player tracking system 1020 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Player tracking information may be combined with other information that is now readily obtainable by an SBG system.

Moreover, DCU 1024 and translator 1025 are not required for all gaming establishments 1001. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machines are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1042 provides this function for gaming establishment 1001. Site controller 1042 is connected to a central system and/or other gaming establishments via one or more networks, which may be public or private networks. Among other things, site controller 1042 communicates with game server 1022 to obtain game data, such as ball drop data, bingo card data, etc.

In the present illustration, gaming machines 1002, 1030, 1032, 1034 and 1036 are connected to a dedicated gaming network 1022. In general, the DCU 1024 functions as an intermediary between the different gaming machines on the network 1022 and the site controller 1042. In general, the DCU 1024 receives data transmitted from the gaming machines and sends the data to the site controller 1042 over a transmission path 1026. In some instances, when the hardware interface used by the gaming machine is not compatible with site controller 1042, a translator 1025 may be used to convert serial data from the DCU 1024 to a format accepted by site controller 1042. The translator may provide this conversion service to a plurality of DCUs.

Further, in some dedicated gaming networks, the DCU 1024 can receive data transmitted from site controller 1042 for communication to the gaming machines on the gaming network. The received data may be, for example, communicated synchronously to the gaming machines on the gaming network.

Here, CVT 1052 provides cashless and cashout gaming services to the gaming machines in gaming establishment 1001. Broadly speaking, CVT 1052 authorizes and validates cashless gaming machine instruments (also referred to herein as "tickets" or "vouchers"), including but not limited to tickets for causing a gaming machine to display a game result and cash-out tickets. Moreover, CVT 1052 authorizes the exchange of a cashout ticket for cash. These processes will be described in detail below. In one example, when a player attempts to redeem a cash-out ticket for cash at cashout kiosk 1044, cash out kiosk 1044 reads validation data from the cashout ticket and transmits the validation data to CVT 1052 for validation. The tickets may be printed by gaming machines, by cashout kiosk 1044, by a stand-alone printer, by CVT 1052, etc. Some gaming establishments will not have a cashout kiosk 1044. Instead, a cashout ticket could be redeemed for cash by a cashier (e.g. of a convenience store), by a gaming machine or by a specially configured CVT.

Figure 1B:
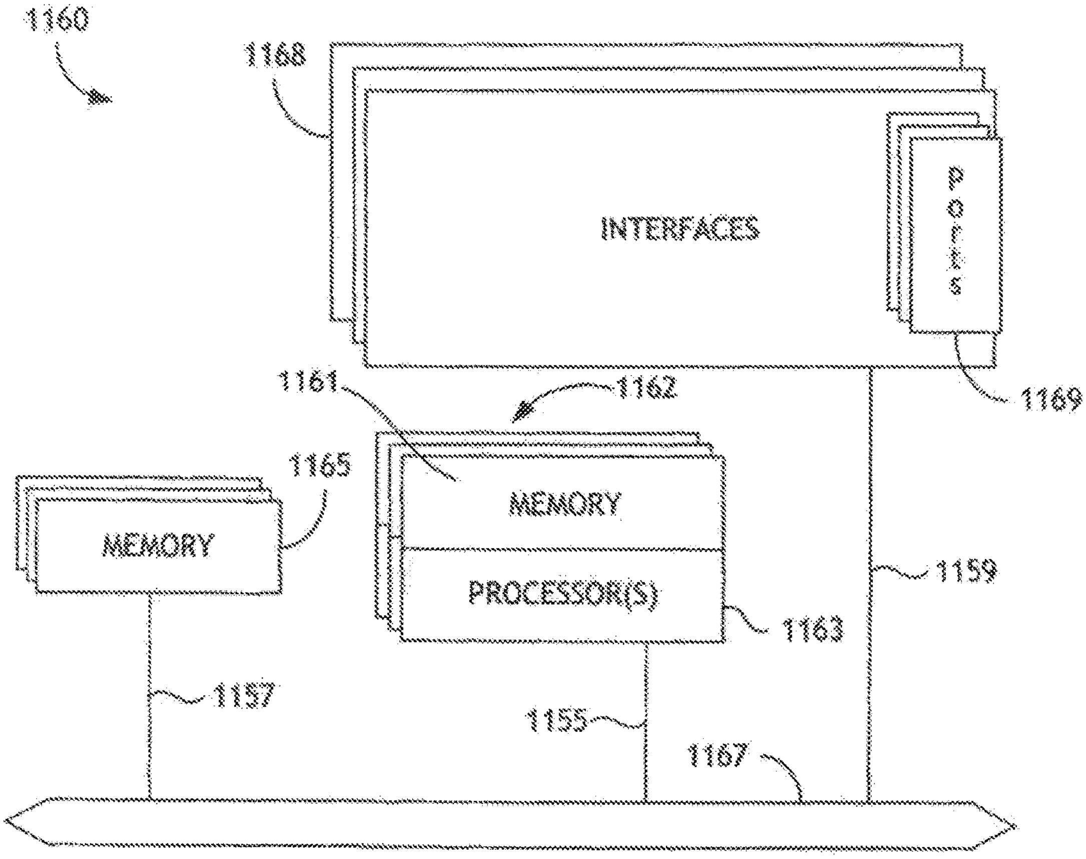
FIG. 1B shows another schematic for an electronic system for enabling play of the gaming method described herein.

FIG. 1B illustrates an example of a network device that may be configured for implementing some methods of the present invention. Network device 1160 includes a master central processing unit (CPU) 1162, interfaces 1168, and a bus 1167 (e.g., a PCI bus). Generally, interfaces 1168 include ports 1169 appropriate for communication with the appropriate media. In some embodiments, one or more of interfaces 1168 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1168 control such communications-intensive tasks as encryption, decryption, compression, decompression, packetization, media control and management. By providing separate processors for the communications-intensive tasks, interfaces 1168 allow the master microprocessor 1162 efficiently to perform other functions such as routing computations, network diagnostics, security functions, etc.

The interfaces 1168 are typically provided as interface cards (sometimes referred to as "linecards"). Generally, interfaces 1168 control the sending and receiving of data packets over the network and sometimes support other peripherals used with the network device 1160. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1162 may be responsible for implementing specific functions associated with the functions of a desired network device. According to some embodiments, CPU 1162 accomplishes all these functions under the control of software including an operating system and any appropriate applications software.

CPU 1162 may include one or more processors 1163 such as a processor from the Motorola family of microprocessors or the MIPS family of microprocessors. In an alternative embodiment, processor 1163 is specially designed hardware for controlling the operations of network device 1160. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

Regardless of network device's configuration, it may employ one or more memories or memory modules (such as, for example, memory block 1165) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 1B illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 1B) or switch fabric based (such as a cross-bar).

Figure 2:
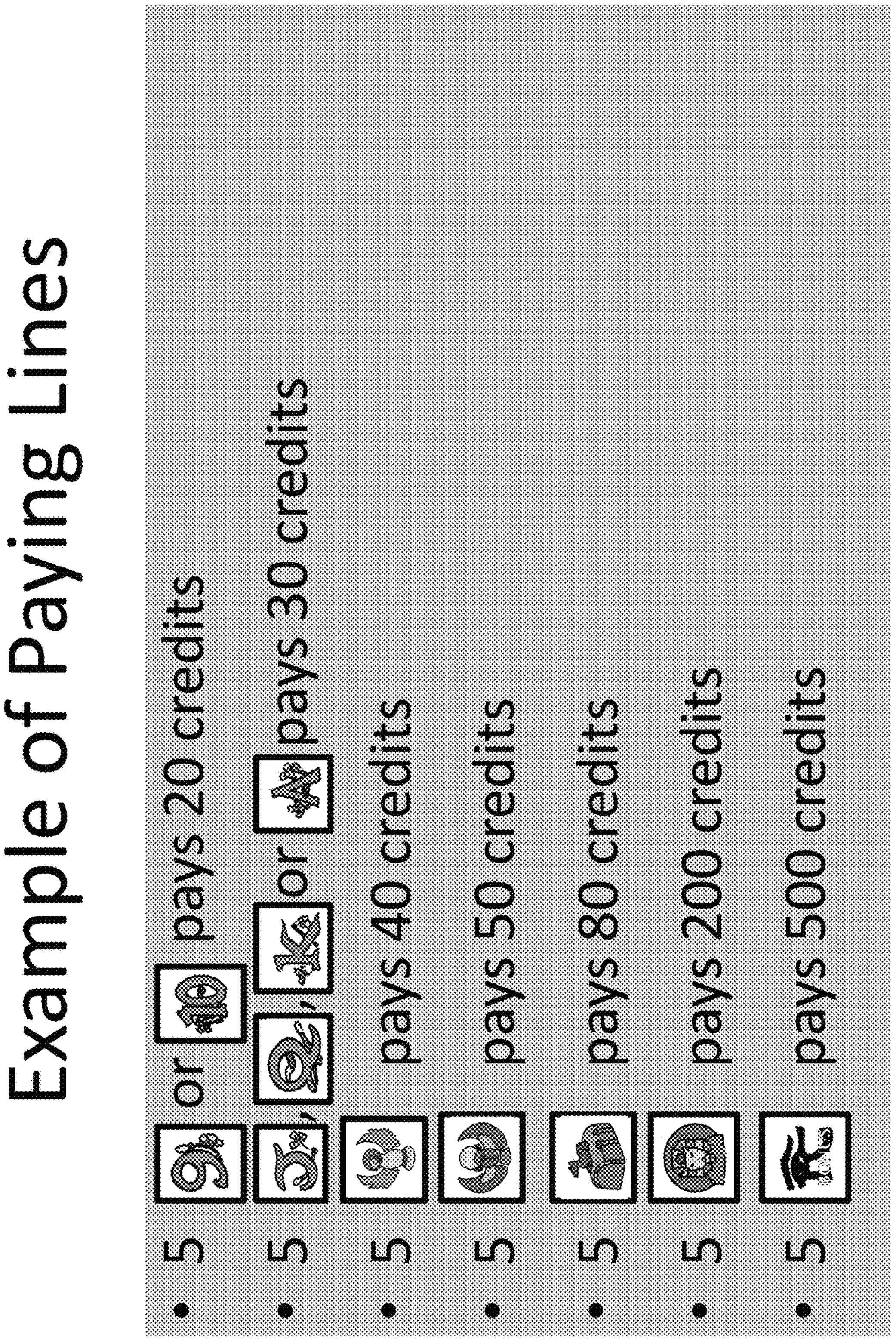
FIG. 2 shows examples of paylines available in a wagering event according to the present technology.
Figure 2A:
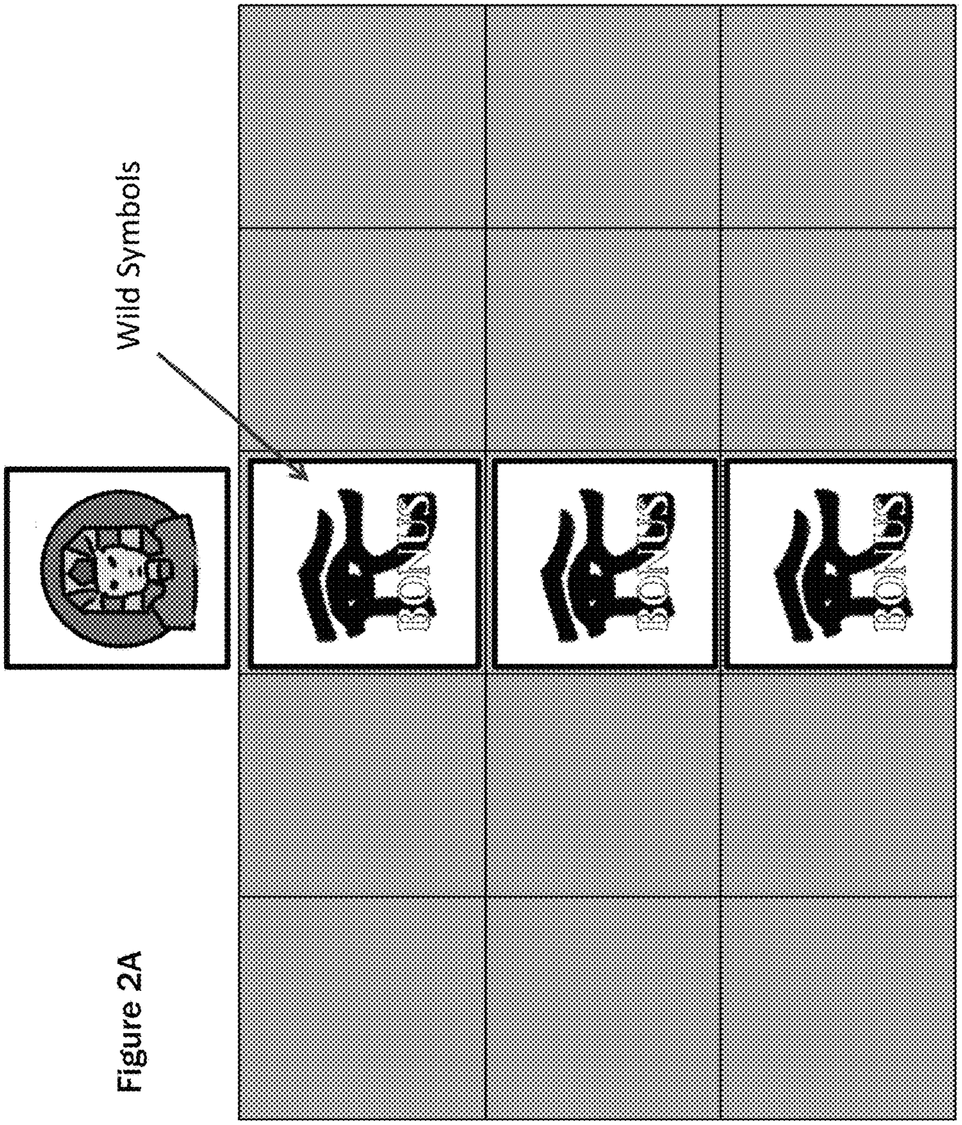
FIG. 2A shows a first bonus screen with only wild symbols in the center column shown.

FIG. 2A shows a first bonus screen with only wild symbols in the center column shown. Symbols are randomly selected and revealed one at a time in a random order. Players would use a swiping motion on the screen or buttons on the machine to indicate which side they want the icon to go on. A first random symbol "King Tut's Fortune" symbol is shown above the columns and rows before placement within active frames.

Figure 2B:
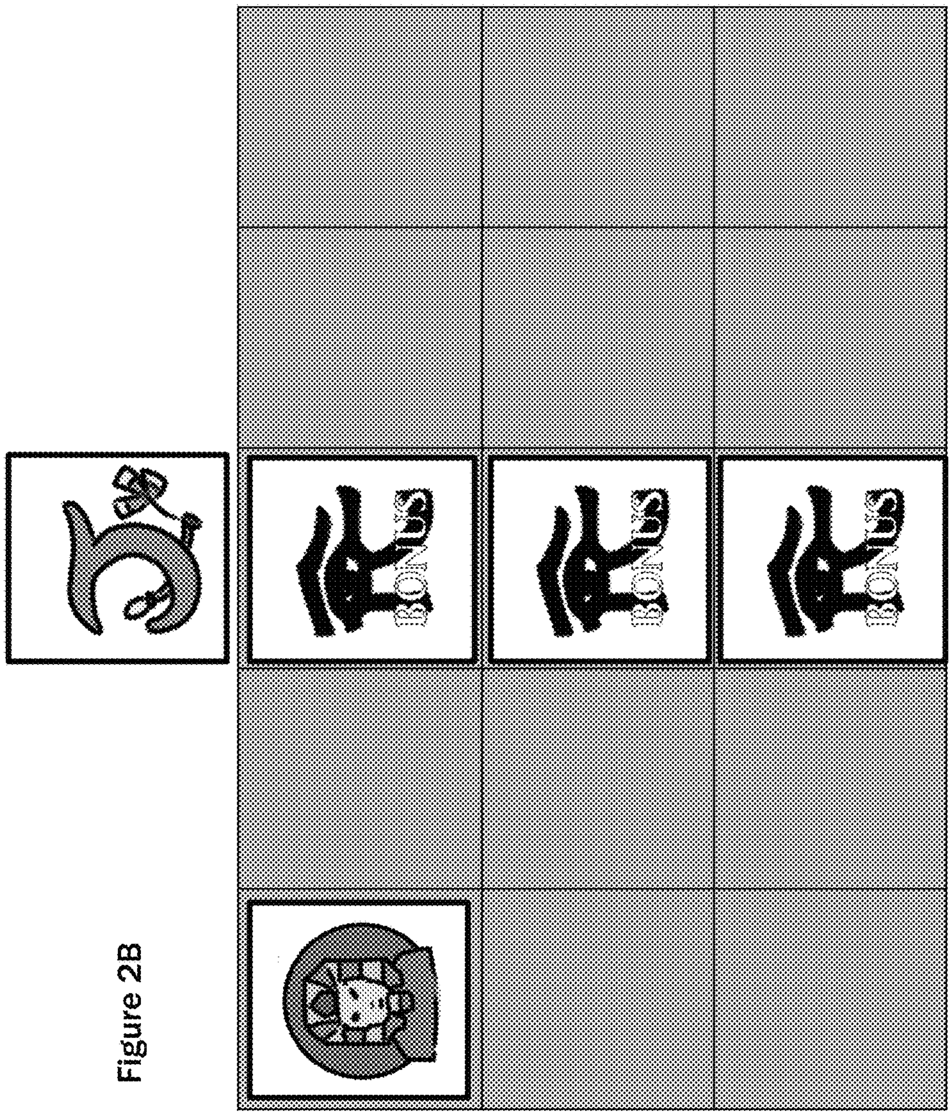
FIG. 2B shows a next screen, where the first random symbol has been placed in the active frames and a next (second) random symbol as a stylized playing card Jack is provided above the active frames.

FIG. 2B shows a next screen, where the first random symbol has been placed in the active frames and a next (second) random symbol as a stylized playing card Jack is provided above the active frames. In this case, when a player has chosen which side he/she wants the slot symbol to fall, the machine randomly chooses a column and row on that side. The player could have identified the specific location where the first random symbol was placed. Having the processor randomly select positions speeds up the game.

Figure 2C:
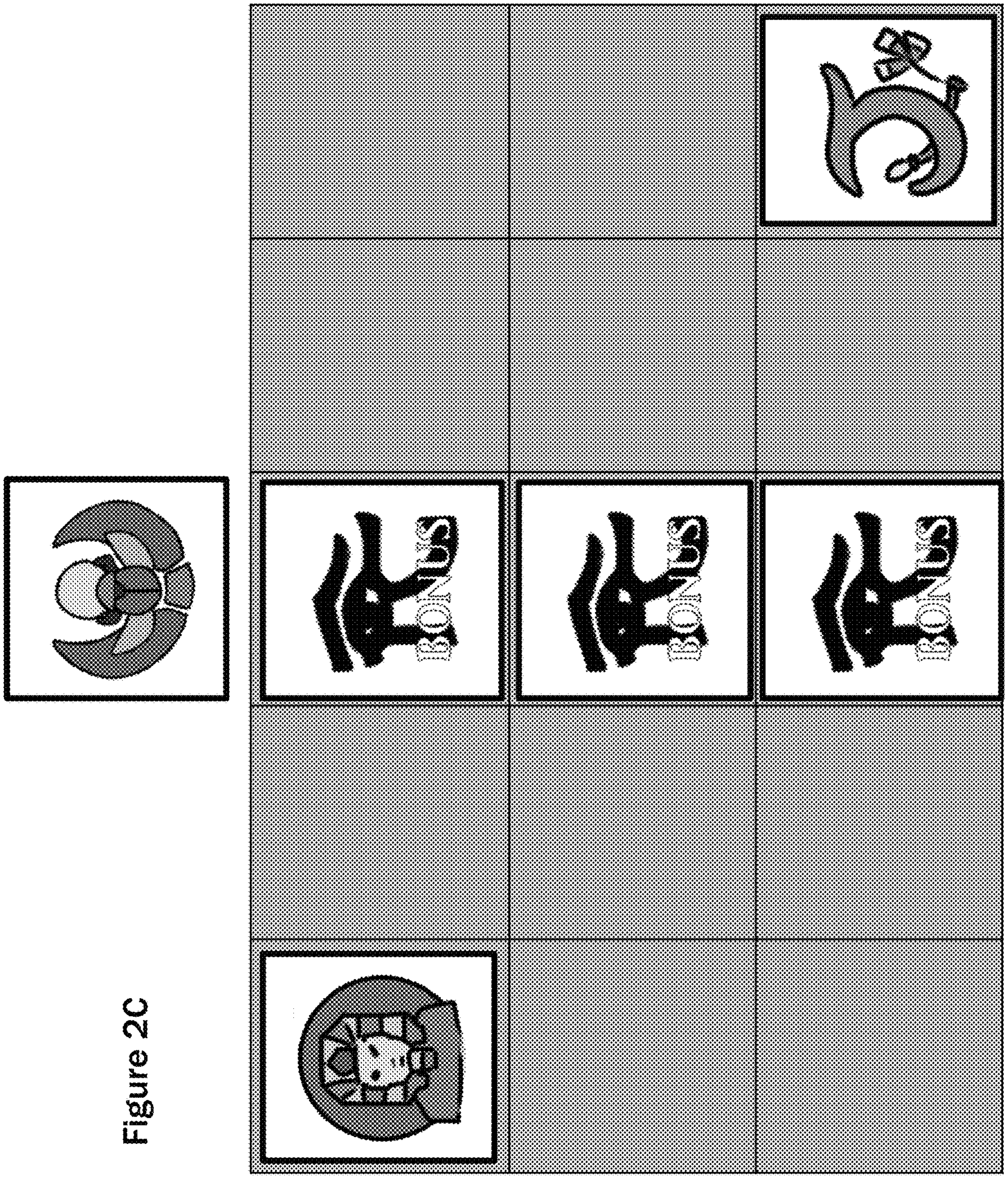
FIG. 2C shows placement of the second random symbol strategically in play of the wagering event.
Figure 2D:
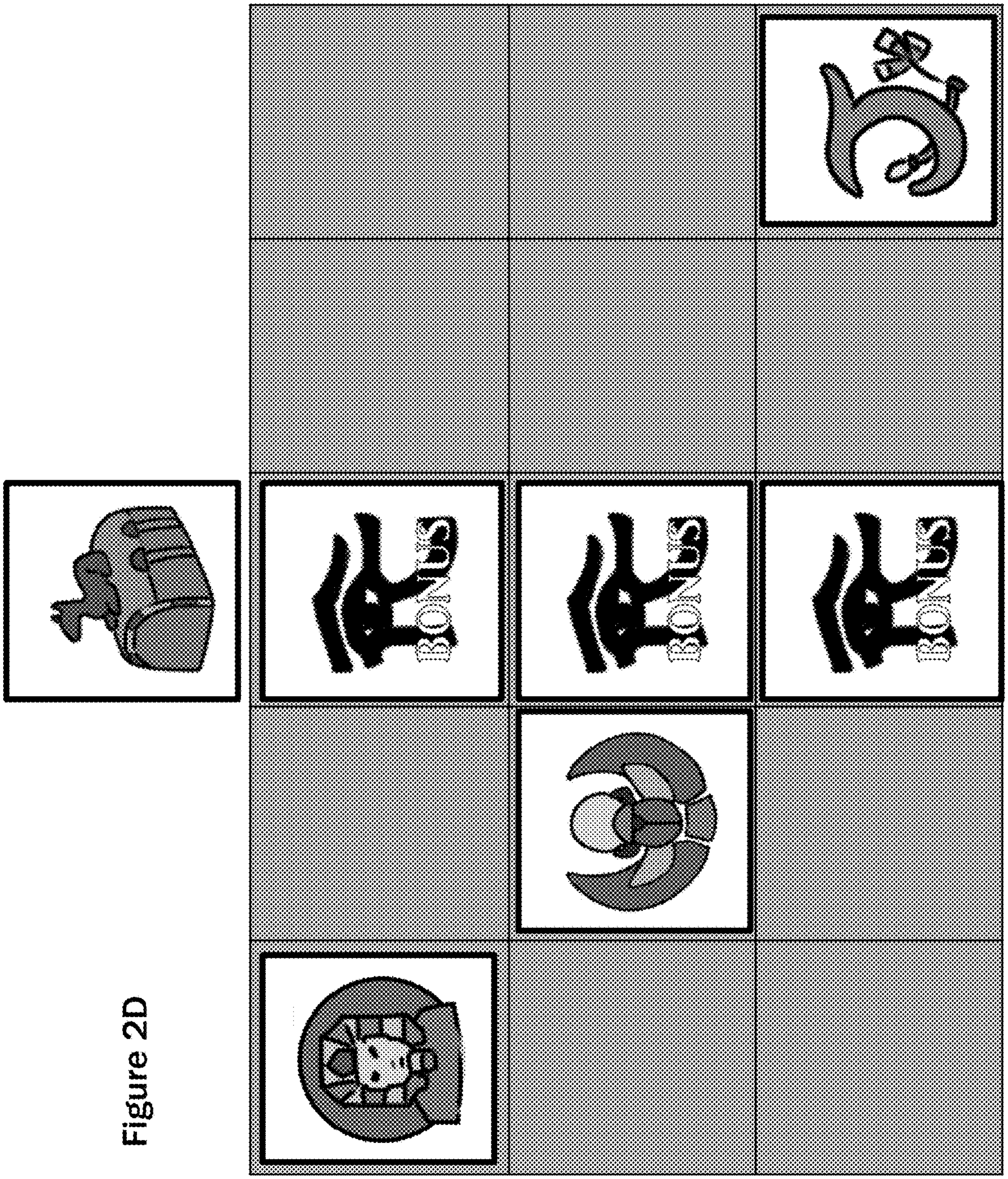
FIGS. 2D through 2M show sequential frames appearing in the wagering event.
Figure 2E:
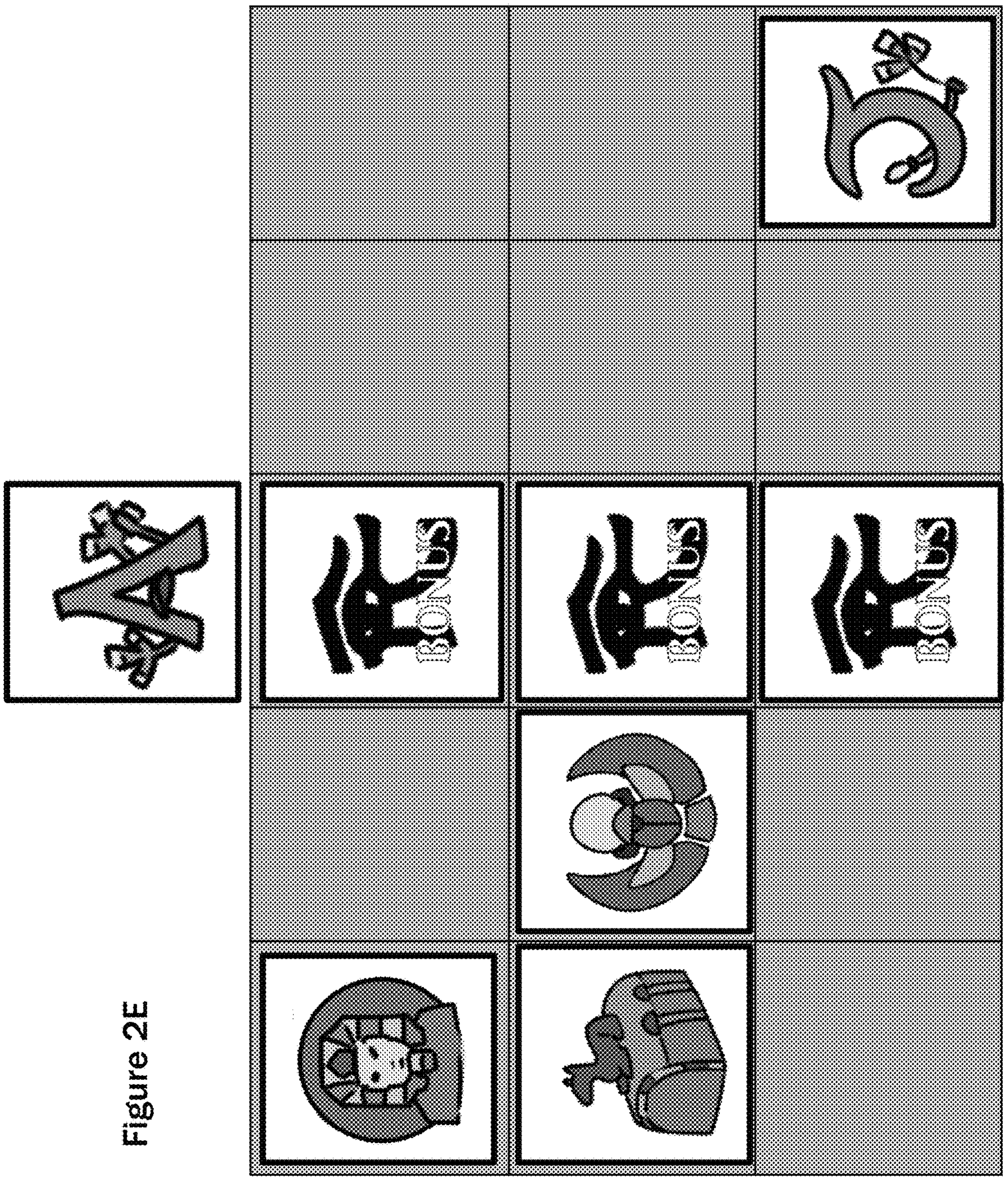
Figure 2F:
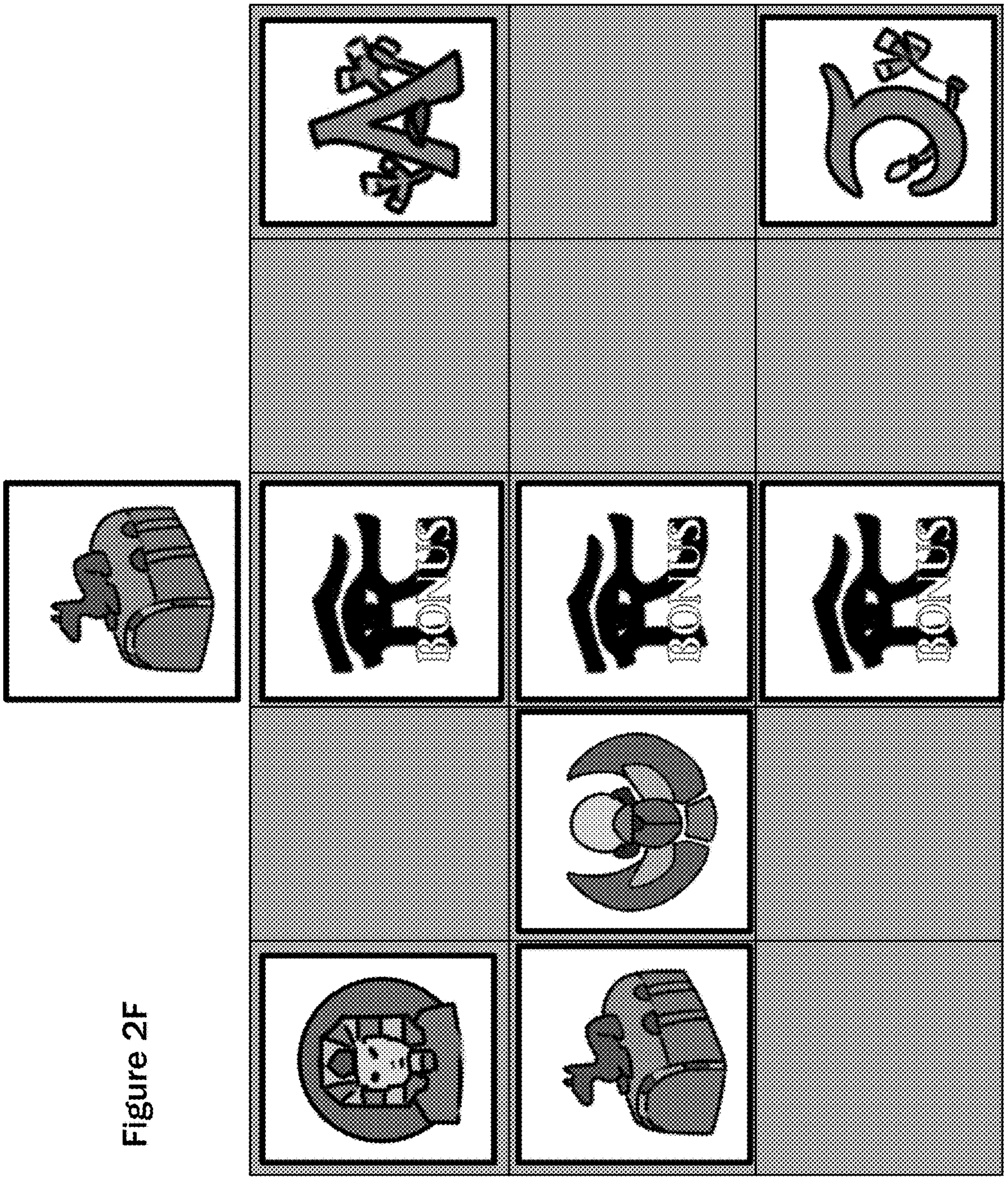
Figure 2G:
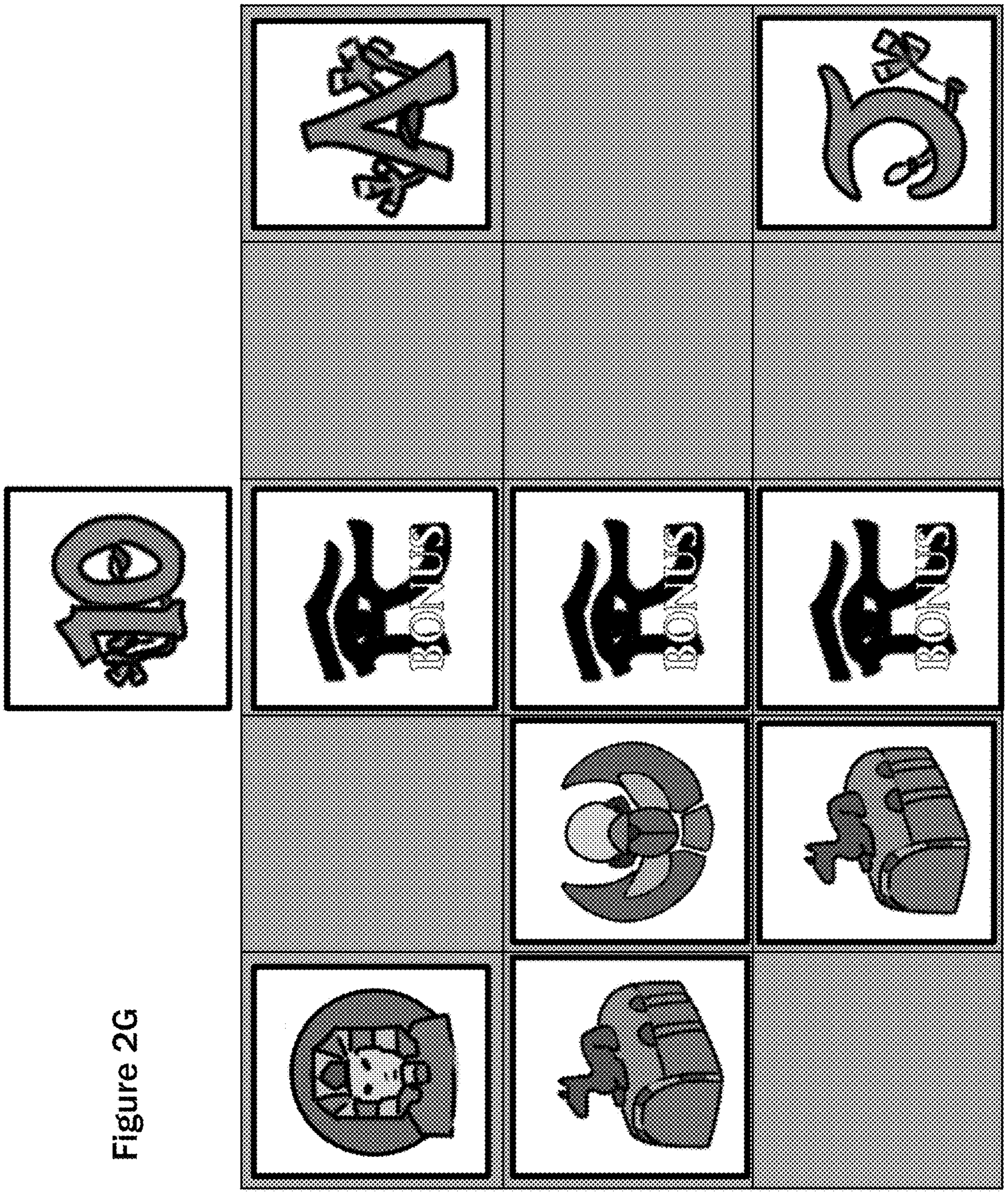
Figure 2H:
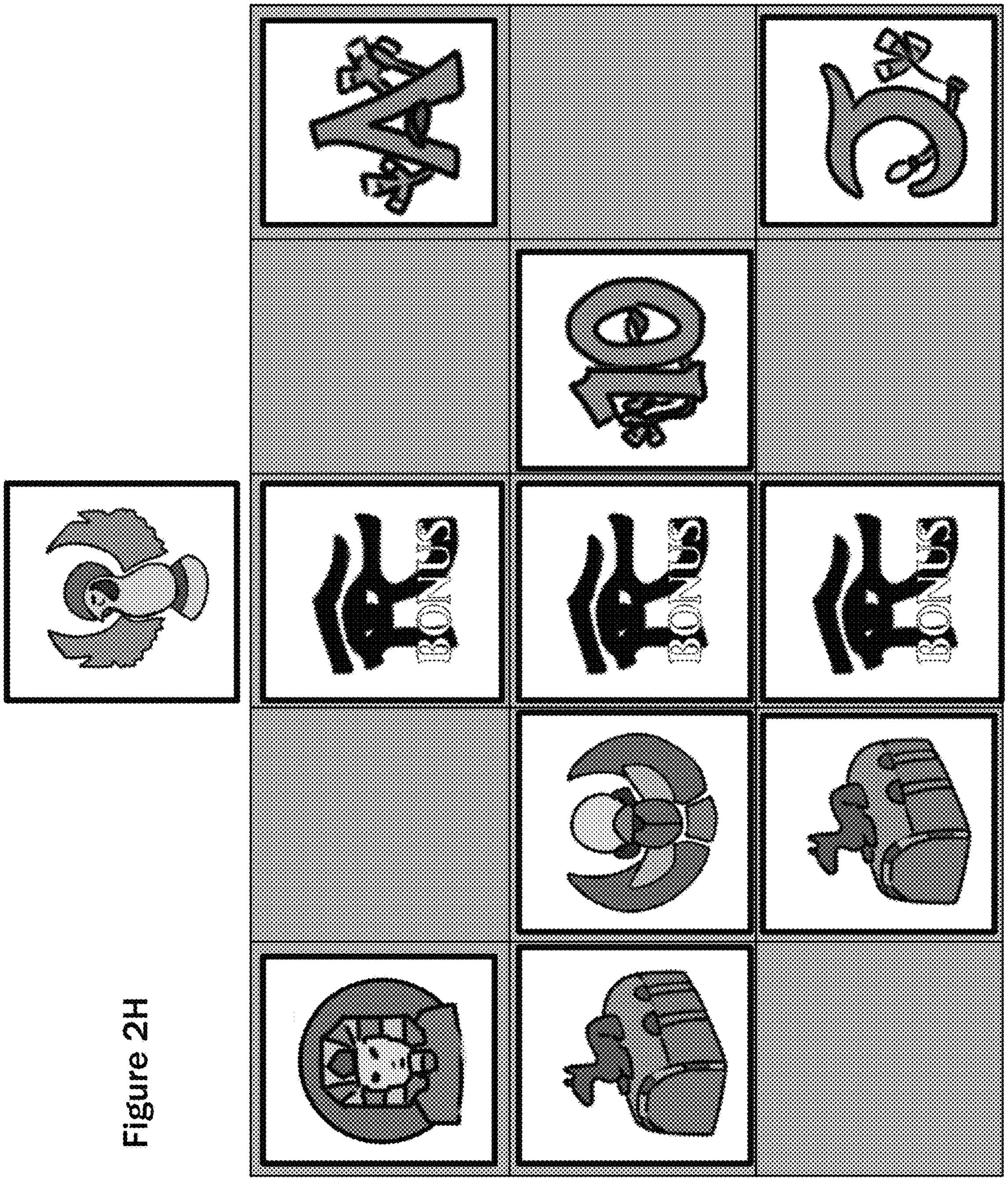
Figure 2I:
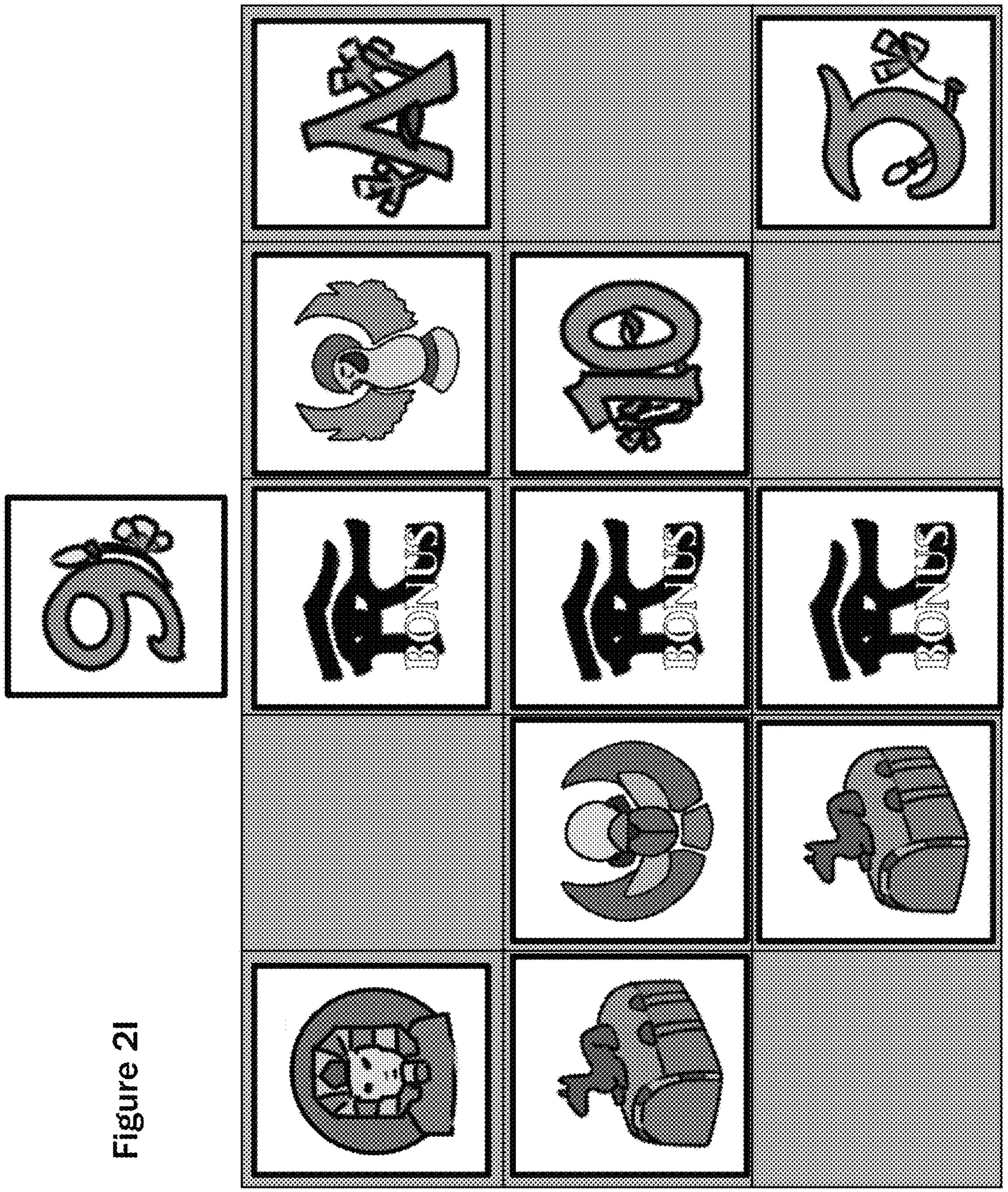
Figure 2J:
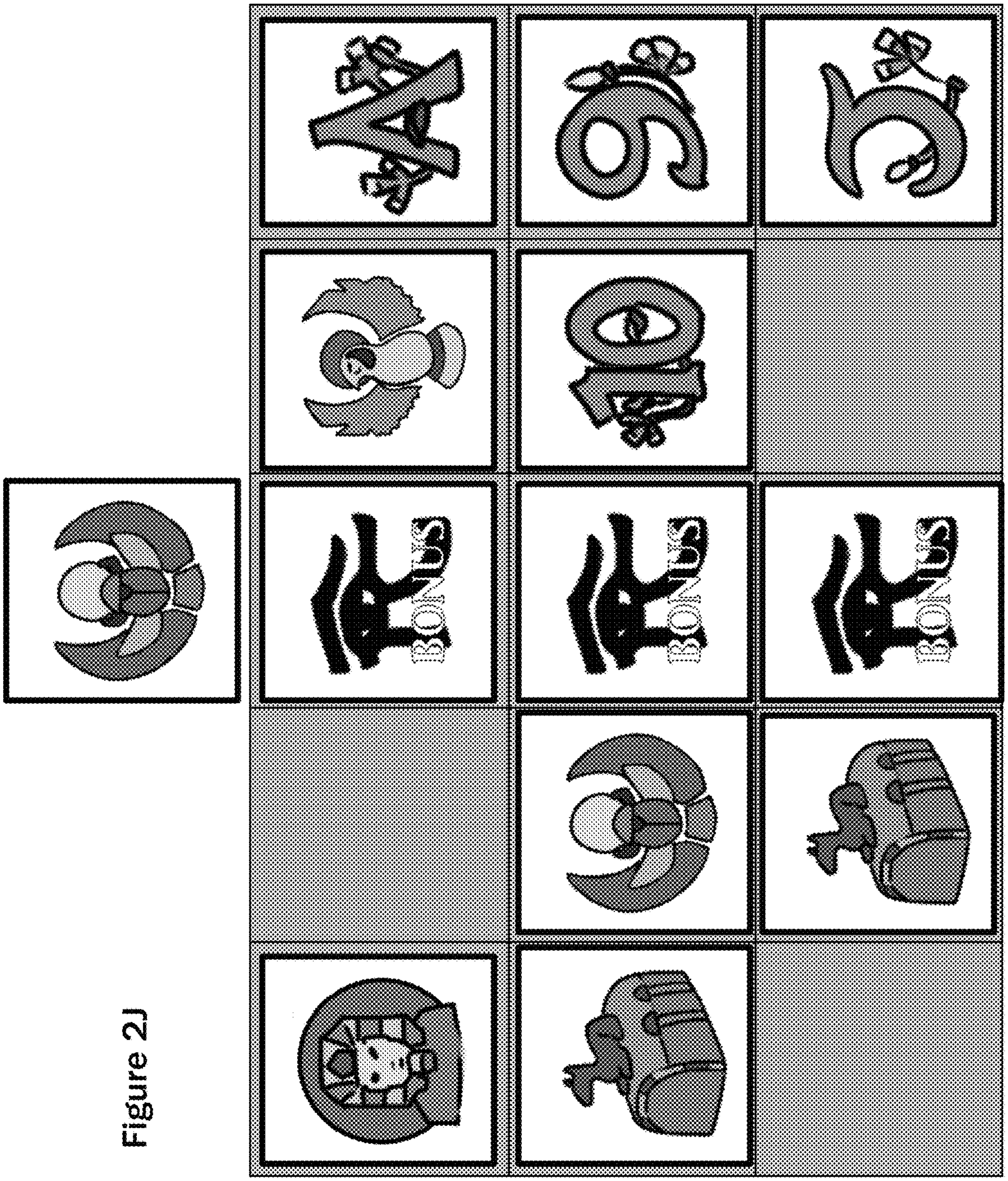
Figure 2K:
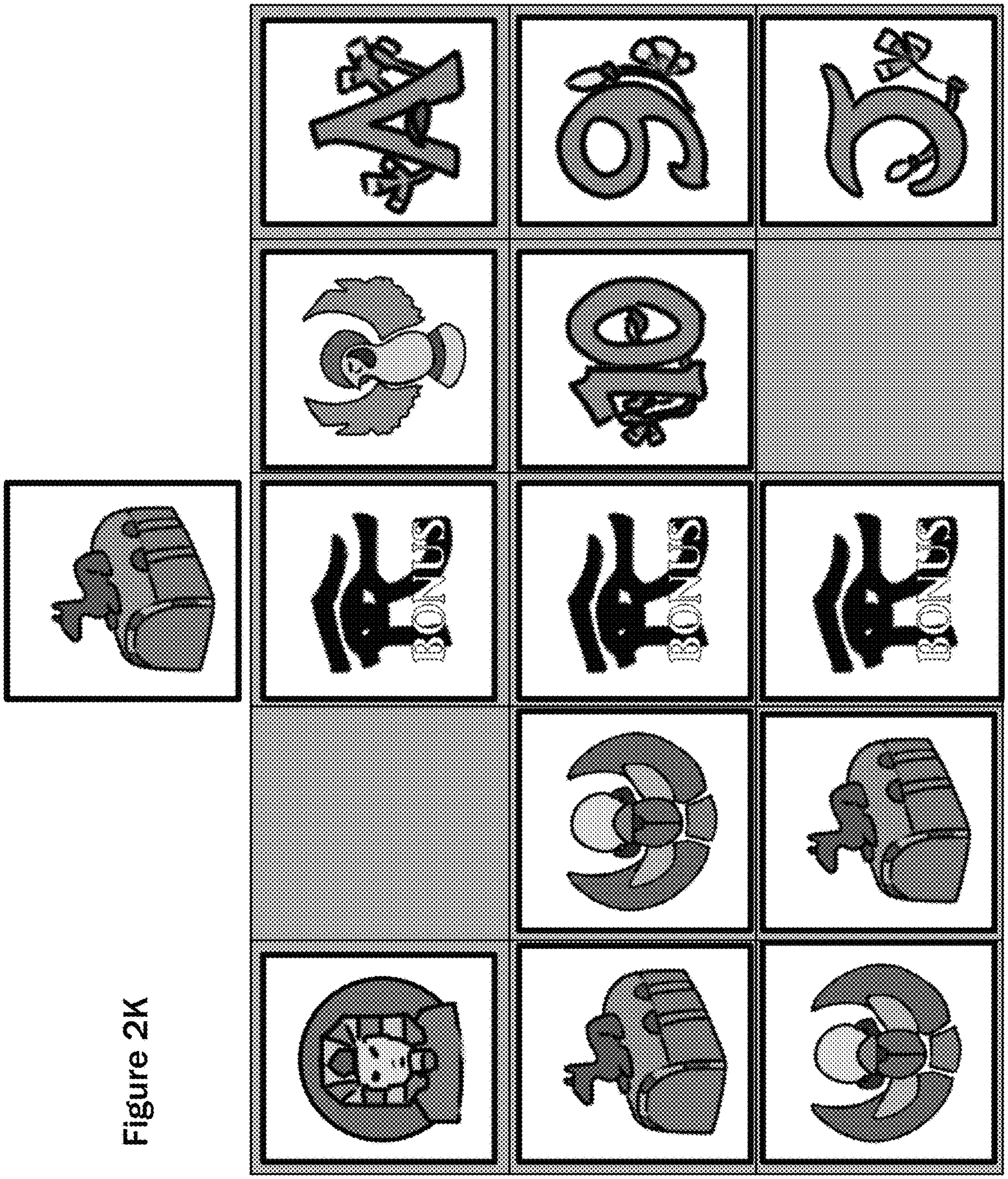
Figure 2L:
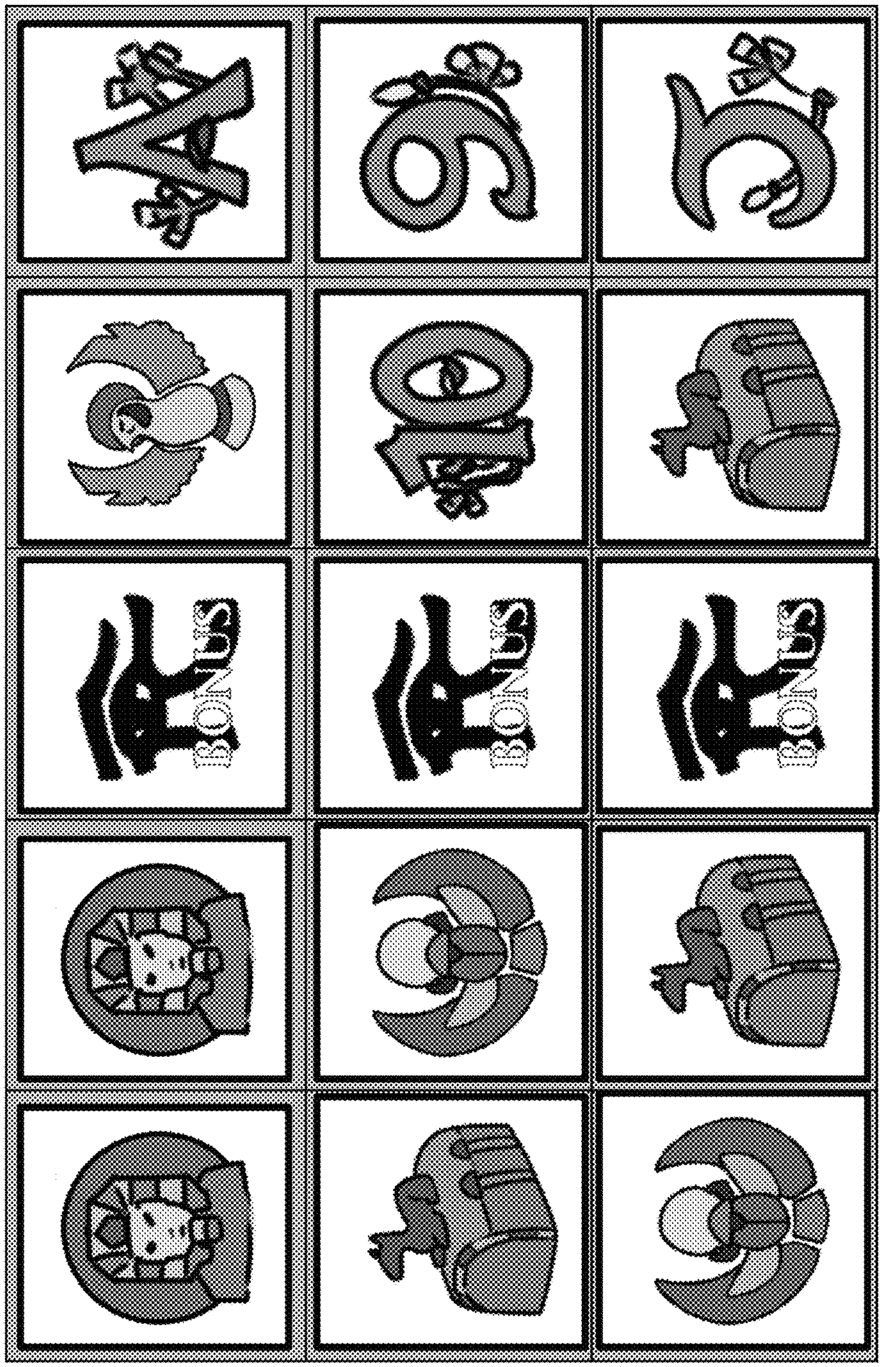
Figure 2M:
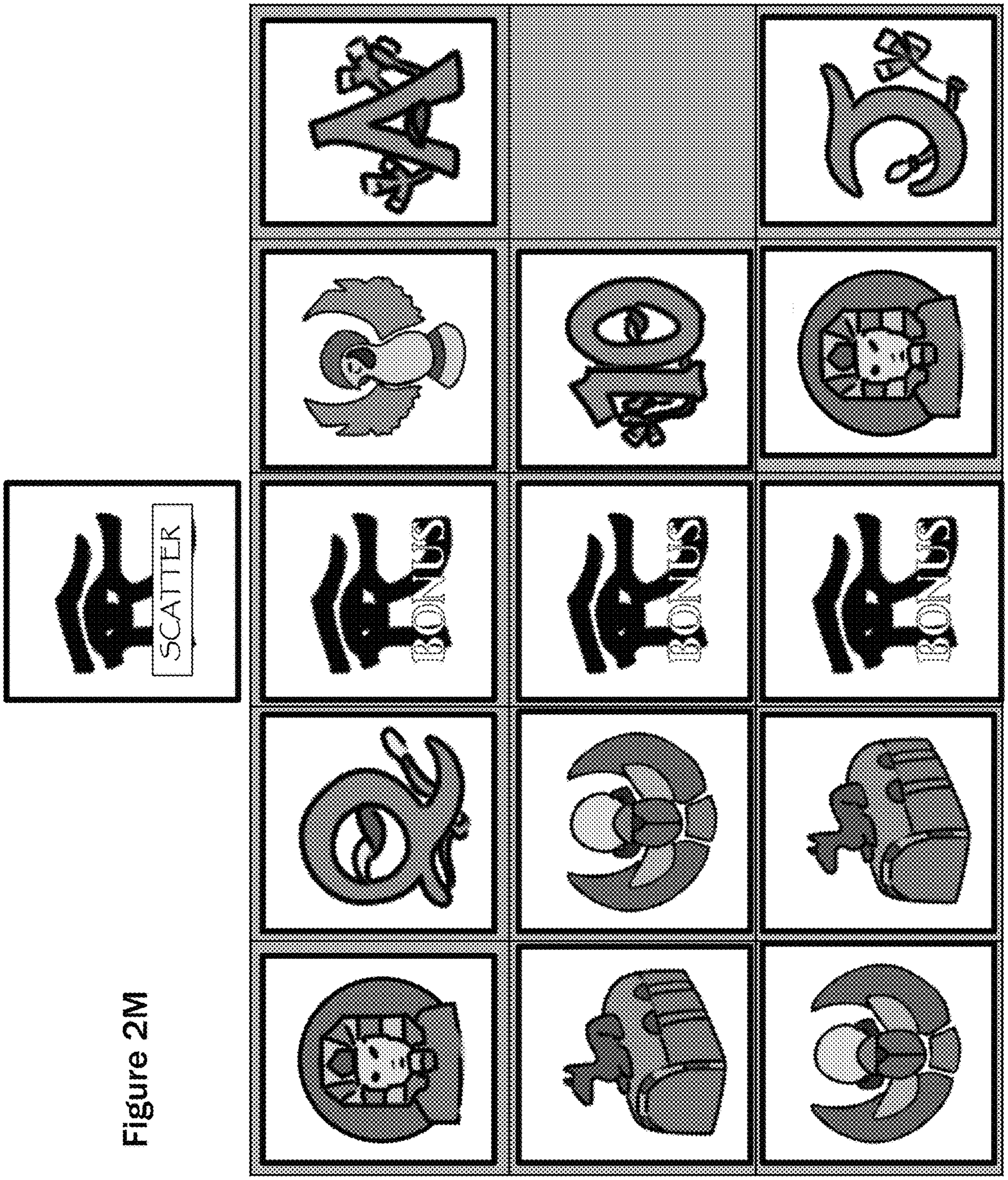
Figure 3:
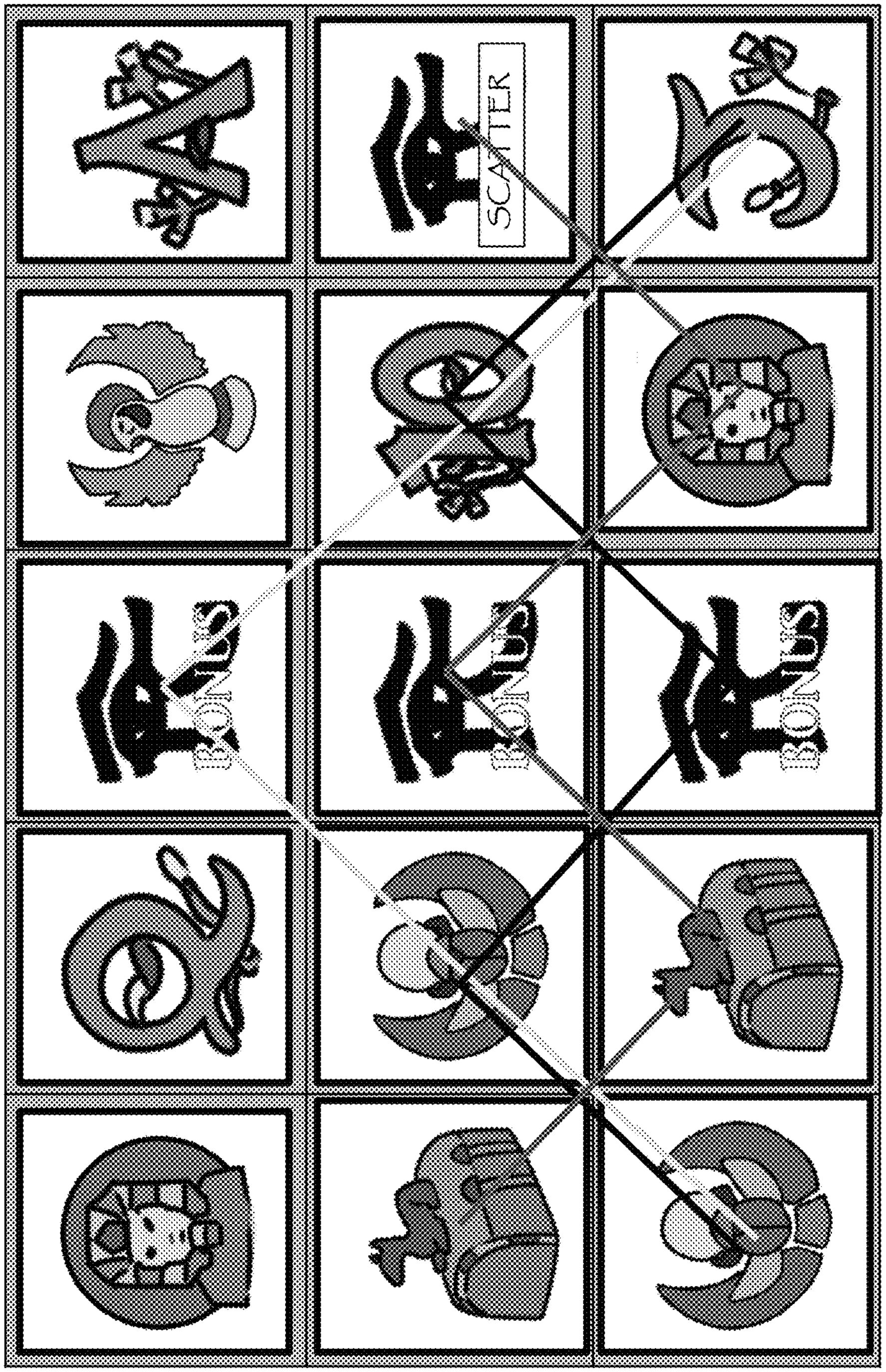
FIG. 3 shows a final screen shot with all frames filled and paylines displayed.

FIG. 2C shows placement of the second random symbol strategically in play of the wagering event. In this instance, the basic starting strategy for the player is to fill the left side of the screen with high scoring icons in an attempt to make as many high paying lines as possible.

FIG. 2D through FIG. 2M show progressive screen shots with processor random selection of next random symbols and processor random placement of the sequential random symbols on opposite sides of the center column.

While this invention is described in terms of preferred embodiments, there are alterations, permutations, and equivalents that fall within the scope of the invention. It should also be noted that there are many alternative ways of implementing the present invention. It is therefore intended that the invention not be limited to the preferred embodiments described herein, but instead that the invention should be interpreted as including all such alterations, permutations, and equivalents as fall within the true spirit and scope of the present invention.

What is claimed:

1. A system for enabling a bonus event in an electronic video gaming machine comprising:

a) a housing for the electronic video gaming machine;

b) a processor within the housing;

c) at least one video display on a front of the housing;

d) player input controls on the front of the housing;

e) touchscreen sensitivity on the video display in communication with the processor;

wherein the processor is configured to accept a wager on an underlying video wagering game and randomly trigger a bonus event on the underlying wagering game;

the processor being configured such that after the bonus game has been initiated, the processor provides and displays at least one wild card symbol in a fixed position within a column of symbols used in a set of frames in columns and rows used to determine a bonus outcome;

the processor being configured such that after displaying the at least one wild symbol in the fixed position, the processor generates a first random symbol for use in the bonus game which is displayed on the video gaming machine;

the processor is configured such that after generation of the first random figure, the touchscreen is activated so that a final position for the first random symbol is selectable by touchscreen identification of the final position in the columns and rows used to determine a bonus outcome, leaving unfilled frames in the columns and rows;

the processor being configured to fill the unfilled frames in the columns and rows with random symbols;

the processor being configured to resolve an outcome of the bonus outcome according to paylines within the columns and rows used to determine a bonus outcome; and wherein the processor is configured to enable touchscreen sensitivity after appearance of the first random symbols allowing for selection of a final position of the first random symbol by first touching the touchscreen at a touch-sensitive position over the random symbol and then by sliding the random symbol to the final position.

2. The system of claim 1 wherein the processor is configured to accept wagering credit for use in the wagers through a ticket system comprising a ticket validator and printer.

3. The system of claim 2 wherein the processor is configured to generate and display the first random symbol at a position on the touchscreen outside of the columns and rows used to determine a bonus outcome.

4. The system of claim 2 wherein the processor is configured to generate and display the first random symbol at a position on the touchscreen within the columns and rows used to determine a bonus outcome.

5. The system of claim 1 having a light display associated with the housing that indicates when a bonus event is occurring.

6. The system of claim 3 wherein the light display is near a top level of the housing so that passersby of the system are alerted that a bonus event is occurring.

7. The system of claim 2 wherein the processor is configured to provide at least some subsequent random symbols to fill the unfilled frames by displaying at least some additional individual random symbols and the processor is configured such that after provision of the at least some subsequent random symbols, the touch screen is activated so that a final position for the at least some subsequent random symbols are selectable by touchscreen identification of the final position in the columns and rows used to determine a bonus outcome, leaving unfilled frames in the columns and rows.

8. The system of claim 7 wherein the processor is configured to allow all unfilled frames after the final position of the first random symbol has been determined by touchscreen positioning of all remaining symbols into frames.

9. The system of claim 7 wherein the processor is configured to allow all unfilled frames after the final position of the first random symbol has been determined by touchscreen positioning of at least some remaining symbols into frames.

10. The system of claim 8 wherein the processor is configured to allow final positioning alternative random systems into positions in columns and rows on opposite sides of the final position for wild symbols, which the processor is configured to position in only a central column position.

11. A method for playing an electronic video gaming machine which provides a bonus event, the electronic video gaming machine comprising a housing for the electronic video gaming machine; a processor within the housing; at least one video display on a front of the housing; player input controls on the front of the housing; and touchscreen sensitivity on the video display in communication with the processor;

the method comprising the steps of:

a) the processor accepting a wager on an underlying video wagering game and at conclusion of a round of play in the underlying game, triggering a bonus event;

b) after the bonus game has been initiated, the processor provides and displays at least one wild card symbol in a fixed position within a column of symbols used in a set of frames in columns and rows used to determine a bonus outcome;

c) after displaying the at least one wild symbol in the fixed position, the processor generates a first random symbol for use in the bonus game which is displayed on the video gaming machine;

d) after generation of the first random figure, the touch screen is activated so that a final position for the first random symbol is selectable by touchscreen identification of the final position in the columns and rows used to determine a bonus outcome, leaving unfilled frames in the columns and rows;

e) the processor filling the unfilled frames in the columns and rows with random symbols;

f) the processor resolving a bonus outcome of the bonus outcome according to paylines within the columns and rows used to determine the bonus outcome; and g) wherein the processor enables touchscreen sensitivity after appearance of the first random symbol, allowing for selection of a final position of the first random symbol, the final position for the first random symbol chosen by a player first touching the touchscreen at a touch-sensitive position over the first random symbol and then sliding the random symbol to the final position by movement of a point of contact on the touch-sensitive position over the first symbol to a touch-sensitive position over the final position.

12. The method of claim 11 wherein the processor accepts wagering credit for use in the wagers through a ticket system comprising a ticket validator and printer.

13. The method of claim 11 wherein the processor generates and display the first random symbol at a position on the touchscreen outside of the columns and rows used to determine a bonus outcome.

14. The method of claim 11 wherein the processor generates and displays the first random symbol at a position on the touchscreen within the columns and rows used to determine a bonus outcome.

15. The method of claim 11 wherein a light display associated with the housing is activated to indicate when a bonus event is occurring.

16. The method of claim 11 wherein the light display is near a top level of the housing and passersby of the system are alerted that a bonus event is occurring.

17. The method of claim 11 wherein the processor provides at least some subsequent random symbols to fill the unfilled frames by displaying at least some additional individual random symbols on the display screen and after provision of the at least some subsequent random symbols to the first random symbol, the touch screen is activated so that a final position for the at least some subsequent random symbols are selected by touchscreen identification of the final position in the columns and rows used to determine a bonus outcome, leaving unfilled frames in the columns and rows.

18. The method of claim 17 wherein the processor allows all unfilled frames after the final position of the first random symbol has been determined to be positioned by touchscreen controlled positioning of all remaining symbols into frames.

19. The method of claim 17 wherein the processor allows all unfilled frames after the final position of the first random symbol has been determined to be filled by touchscreen positioning of at least some remaining symbols into frames.

20. The method of claim 18 wherein the processor allows final positioning alternative random systems into positions in columns and rows on opposite sides of the final position for wild symbols, which the processor positions in only a central column position.

* * * * *